United States Patent
Bankstahl

(10) Patent No.: US 6,624,543 B1
(45) Date of Patent: Sep. 23, 2003

(54) METHOD AND APPARATUS FOR CENTERING A GENERATOR STATOR AND ROTOR

(75) Inventor: Herb Bankstahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/404,233

(22) Filed: Sep. 23, 1999

(51) Int. Cl.$^7$ .................................................. H02K 5/00
(52) U.S. Cl. ............................................ 310/91; 310/89
(58) Field of Search ............................... 310/91, 89, 42; 322/1; 123/2, 3, 195 C, 195 A; 290/1 B; 60/39.31; 29/596

(56) References Cited

U.S. PATENT DOCUMENTS

| | | | | | |
|---|---|---|---|---|---|
| 4,203,710 A | * | 5/1980 | Farr | ...................... | 417/53 |
| 4,677,940 A | * | 7/1987 | Bracht et al. | ................... | 123/2 |
| 4,779,905 A | * | 10/1988 | Ito et al. | ...................... | 290/1 B |
| 5,458,100 A | * | 10/1995 | Neuenfeld | .............. | 123/195 A |
| 5,546,901 A | * | 8/1996 | Acker et al. | ............ | 123/195 C |
| 5,965,999 A | * | 10/1999 | Frank | ............................. | 322/1 |
| 6,133,659 A | * | 10/2000 | Rao | ............................. | 310/89 |

OTHER PUBLICATIONS

Miller® The Power of Blue Big Blue 251D Owner's Manual Dec. 1998.

\* cited by examiner

*Primary Examiner*—Nicholas Pononarenke

(57) ABSTRACT

A method and apparatus for mounting a generator to an engine to concentrically align a stator with a rotor is disclosed. The engine powered generator includes an engine and a plate or wall mounted to the engine. A generator is mounted to the plate. The stator is secured in a generator housing having a circular cross section. A plurality of pins, preferably six or more, on the plate contact a surface of the housing. The pins may be dowels and/or cylindrical, and contact an inner and/or outer housing surface, tangentially or otherwise. The wall is substantially normal to the axis about which the engine shaft rotates. The pins protrude from the wall parallel to the axis, and the stator may be permanently affixed to the housing.

23 Claims, 4 Drawing Sheets

METHOD AND APPARATUS FOR CENTERING A GENERATOR STATOR AND ROTOR

FIELD OF THE INVENTION

The present invention relates generally to an apparatus and method for concentrically aligning parts. More specifically, it relates to an engine powered generator having a stator concentrically aligned with a rotor.

BACKGROUND OF THE INVENTION

It is well known to power an electric generator using an engine. The flywheel of the engine is attached to the rotor of the generator. The rotor spins inside of a stator. The stator is held stationary inside of a housing. The stator housing assembly in turn is mounted to an adapter plate or fly wheel housing which is fixed to the engine behind the flywheel.

There is generally a small air gap between the rotor and the stator. The quality of the electric output of the generator is dependent upon the air gap having a constant size as the rotor spins. The rotor and the stator must be concentrically aligned with each other to achieve the desired constant size or dimensional uniformity.

Prior art attempts to achieve the required degree of concentricity involve tightly controlling the alignment of the stator housing assembly with the adapter plate. In one prior art method, the surface of the adapter plate is machined to form a circular pilot ring on its surface. The adaptor plate is fixedly mounted to the engine at a predetermined and known location behind the flywheel (which has the rotor attached to it). The stator is secured inside of the cylindrical housing, also at a predetermined and known location within the housing. The diameter of the end of the cylindrical stator housing assembly is slightly larger or slightly smaller than the diameter of the pilot ring on the adapter plate. The stator housing assembly, when placed over the rotor and aligned with the pilot ring, fits snugly onto the pilot ring. By tightly controlling the location and alignment of the stator housing assembly with respect to the pilot ring, therefore, the axis of the stator is indirectly forced into concentric alignment with the axis of the rotor.

This prior art method of alignment requires several expensive manufacturing steps to insure that the desired concentricity is obtained. For instance, the adaptor plate surface must be accurately machined to form and locate the pilot ring. This machining step is expensive. It is therefore desirable to have an adapter plate that does not require any machining.

One prior art housing is made from a relatively thin steel plate that is rolled into a cylinder and welded along the seam. A steel end ring is welded to each end of the housing to provide a proper surface for alignment with the continuous pilot ring. The end rings are made from relatively thick steel bar stock that is rolled into a ring and welded to the end of the housing. A gap is left between the ends of the rolled steel bar stock to accommodate the starter motor that extends out over the flywheel.

Different engine manufacturers locate the starter motor at different locations around the circumference of the flywheel. As a result, the location of the gap in the housing end ring that accommodates the starter motor is different for different engines and a different housing configuration must be provided for each different engine type. It is desirable therefore to have a single housing configuration that accommodates more than one type of engine.

The stator is press fit into the housing. A tight fit results when the stator contacts the inner surface of the housing at many points. The end rings are added to the housing assembly to provide a surface for alignment with the continuous pilot ring. These end rings add rigidity to the housing assembly and in the process may change the roundness of the housing. This results in the stator having too little contact to be securely held in place. It is necessary to drill through the housing into the stator and to weld the stator in place in these situations. The drilling process damages the painted outer surface of the housing and the housing must later be repainted to prevent corrosion from occurring. All of these additional steps to secure the stator in place add extra cost to the generator. It is therefore desirable to have a stator housing assembly without end rings wherein the stator is adequately secured in place by simply press fitting the stator into the housing without any further processing required.

The prior art cylindrical stator housing assembly also requires machining of the end rings to provide for proper and accurate alignment with the circular pilot ring. The stator housing assembly, which can weigh in excess of 200 pounds, is typically mounted on a lathe and the end rings are accurately machined thereon. This machining step is not only expensive, but in many cases dangerous due to the large weight of the spinning stator housing assembly on the lathe.

Another problem is that sharp metal chips produced during the machining operation can inadvertently land inside of the stator housing assembly. The stator is made up largely of copper wire that is insulated with, and sealed in, varnish. If left undetected, these stray metal chips can damage the insulation surrounding the copper wires. This can result in a shorted winding during operation of the generator. It is desirable therefore to entirely eliminate the machining operations applied to the stator assembly.

FIG. 1 shows a prior art generator 101 using a pilot ring to align the stator and rotor. Engine/rotor assembly 100 includes an engine (not shown), a flywheel 102, a starter motor (not shown), and a rotor 104. Rotor 104 is mounted to flywheel 102 at a predetermined and known location and spins with flywheel 102. The starter motor is used to start flywheel 102 spinning and typically protrudes outward from the side of flywheel 102. The location of the starter motor varies from engine manufacturer to engine manufacturer.

An adapter plate 105 is mounted to the engine block behind flywheel 102. Adapter plate 105 is also mounted at a predetermined and known location. Prior art adapter plate 105 includes a circular pilot ring 106 and mounting holes 107. Pilot ring 106 is created by machining the surface of adaptor plate 105, and has a mostly continuous outside pilot ring surface 109. Pilot ring 106 provides for alignment of a stator with rotor 104 as will be explained later.

A prior art stator housing assembly 200 is also shown in FIG. 1. Stator housing assembly 200 includes a stator 201 and a housing 202. Housing 202 typically is made by rolling a steel plate into a cylinder and then welding or otherwise joining the edges of the steel plate together. A steel end ring 203 is welded to each end of housing 202. Stator 201 is then press fit into housing 202. The location of stator 201 inside of housing 202 is also predetermined and known. One end of housing 202 is adapted for attachment to engine/rotor assembly 100. The other end of housing 202 is adapted for attachment to a bearing assembly or other device in a similar manner.

Steel end ring 203 is generally included to provide a surface on the end of stator housing assembly 200 that can be accurately machined. This insures that stator 201 will be concentrically aligned with rotor 104 when stator housing assembly 200 is attached to engine/rotor assembly 100. End ring 203 is typically formed from steel bar stock that is also rolled into shape. Unlike the steel plate used to make housing 202, however, the ends of the steel bar used to make end ring 203 are not brought together. Rather, the ends are left separated to form a starter motor gap (not shown) in end ring 203. The starter motor gap is located to accommodate the protruding starter motor when stator housing assembly 200 is mounted to engine/rotor assembly 100. Different engine manufacturers locate their starter motors at different locations around the flywheel. The starter motor gap must therefore be located at a different location for different engine types. Different stator housing assemblies are therefore needed for different engine types.

End ring 203 typically has a carefully machined inside end ring surface 205. End ring 203 also includes mounting holes 207, each of which is positioned to align with a corresponding mounting hole 107 on adapter plate 105.

Stator housing assembly 200 is mounted to engine/rotor assembly 100 in the following manner during assembly of the prior art welding generator. First, adapter plate 105, with a mostly continuous pilot ring 106 machined thereon, is mounted to the engine at a predetermined and known location behind flywheel 102. Next, stator housing assembly 200 (with stator 202 secured therein) is positioned in front of engine/rotor assembly 100 with the starter motor aligned with the starter motor gap in end ring 203. Stator housing assembly 200 is then brought into contact with engine/rotor assembly 100 as discussed below for various prior art embodiments.

Inside end ring surface 205 has a diameter that is slightly larger than the diameter of the mostly continuous outside pilot ring surface 109. The result is that end ring 203 tightly fits over and is in continuous contact with pilot ring 106. The tight fit between end ring 203 and pilot ring 106 insures that stator 201 will be concentrically aligned with rotor 104.

After final alignment stator housing assembly 200 is secured to engine/rotor assembly 100 at mounting holes 107 and corresponding mounting holes 207 (see FIG. 1) using bolts 108 or other fasteners.

A method (from a different art) of aligning a transmission with an engine is to use pins and pilot holes. Pins (usually two) are mounted on a plate on the engine, and pilot holes are drilled into the end face of the transmission (or flywheel housing). Each of the pins is located to be inserted into a corresponding pilot hole. The pilot holes must be accurately located to align with the pins and thereby provide the degree of concentricity needed. Accurately locating the holes with respect to the pins adds extra expense to the generator. It is desirable therefore to have a method for concentrically aligning the stator with the rotor that does not depend on accurate alignment of pins with pilot holes.

SUMMARY OF THE PRESENT INVENTION

According to a first aspect of the invention an engine powered generator includes an engine and a plate mounted to the engine. A generator is mounted to the plate. The generator includes a rotor, a stator and a housing. The stator is secured in the housing. A plurality of pins on the plate contact a surface of the housing, to concentrically align the stator with the rotor.

According to a second aspect of the invention an engine powered generator includes an engine with a wall and an output shaft rotating about an axis. The wall has a plurality of pins located about the axis and protruding from the wall. A generator has a rotor, connected to the output shaft so that it and rotates about the axis, and a stator, secured in a housing. The housing has a housing surface. The generator is located on the wall by contacting the pins with the housing surface at a first end of the housing.

According to a third aspect of the invention a method for concentrically aligning a stator with a rotor of a generator includes mounting a first plate to the engine. The first plate has a plurality of pins on it. The stator is secured in a housing, and the housing is aligned with the plurality of pins such that each of the plurality of pins contacts a surface of the housing to concentrically align the stator with the rotor. The generator is mounted on the first plate.

The plurality of pins includes at least three pins, or at least six pins, and the pins are dowels and/or round in various alternative embodiments.

The plurality of pins contact an inner housing surface, or an outer housing surface in other alternatives, and the contact is tangential in other embodiments.

The housing has a circular cross section in one embodiment.

The wall is substantially normal to the axis, and the pins protrude from the wall parallel to the axis, and the stator is permanently affixed to the housing, in alternative embodiments.

Other principal features and advantages of the invention will become apparent to those skilled in the art upon review of the following drawings, the detailed description and the appended claims.

Figure 1:
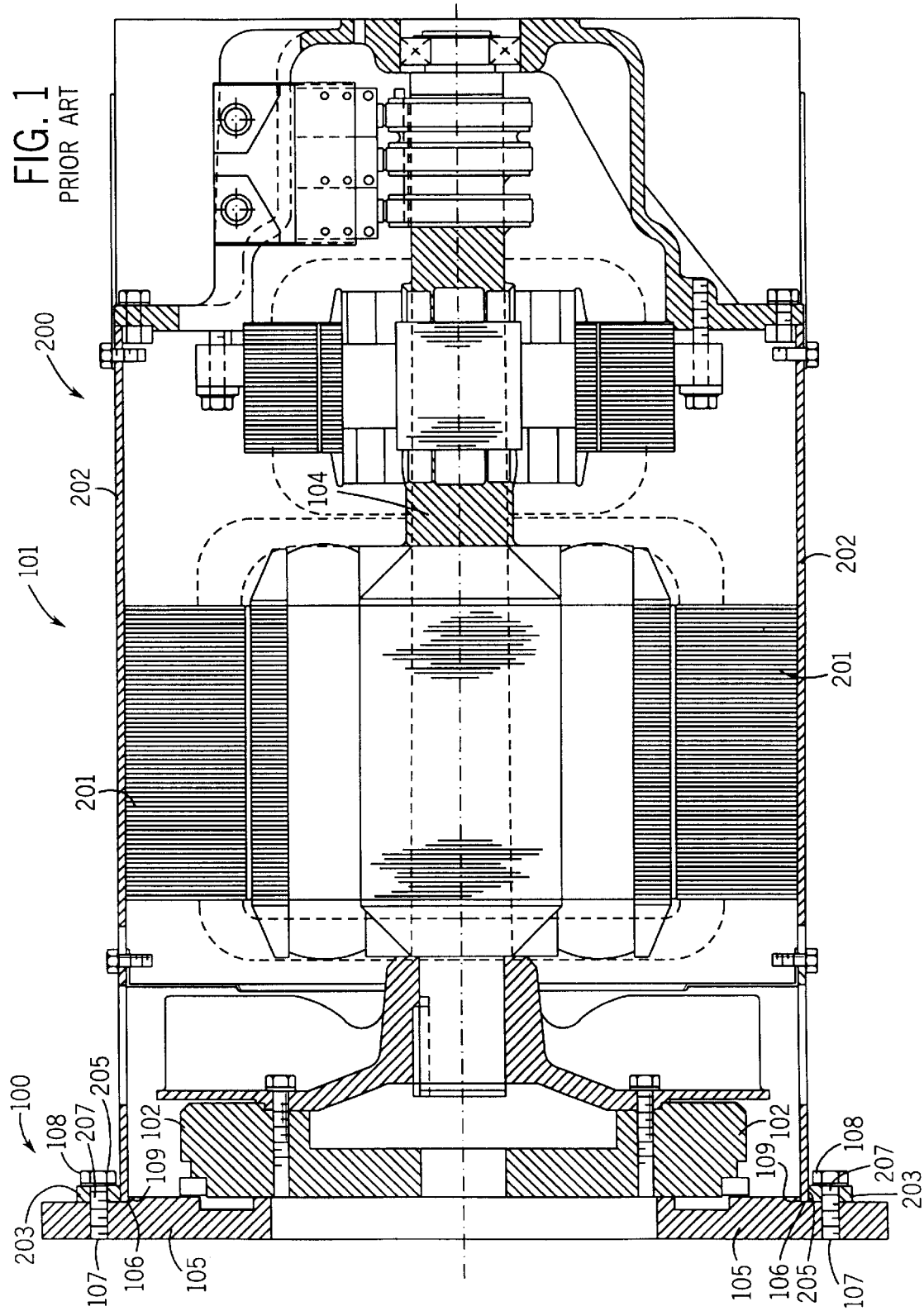
FIG. 1 shows a cross-section of a prior art generator.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a welding generator, it should be understood at the outset that the invention may be implemented with any generator or other apparatus having two or more parts that must be concentrically aligned. Furthermore, although a specific welding generator configuration is described herein, it should also be understood at the outset that the present invention may be implemented with other welding generator configurations.

Generally, the present invention involves an engine powered welding generator having a stator concentrically aligned with a rotor and a method and structure for aligning these two parts. Concentric alignment of the stator with the rotor insures that there will be dimensional uniformity in the air gap that exists between the stator and the rotor as the rotor spins. This, in turn, helps assure a high quality electric signal output from the welding generator.

Stator, as used herein, is the stationary part of a generator, and may be on the inside or outside of the rotor. Rotor, as used here is the non-stationary part of a generator, and may be on the inside or outside of the stator part.

A typical engine powered generator is made up of two assemblies, an engine fly wheel/rotor assembly and a stator housing assembly. The rotor is mounted to the engine at a predetermined and known location within the engine fly wheel/rotor assembly. Likewise, the stator is located at a predetermined and known location within the stator housing assembly. Concentrically aligning the stator with the rotor, therefore, is accomplished indirectly by properly aligning the stator housing assembly with the engine/rotor assembly.

Figure 2:
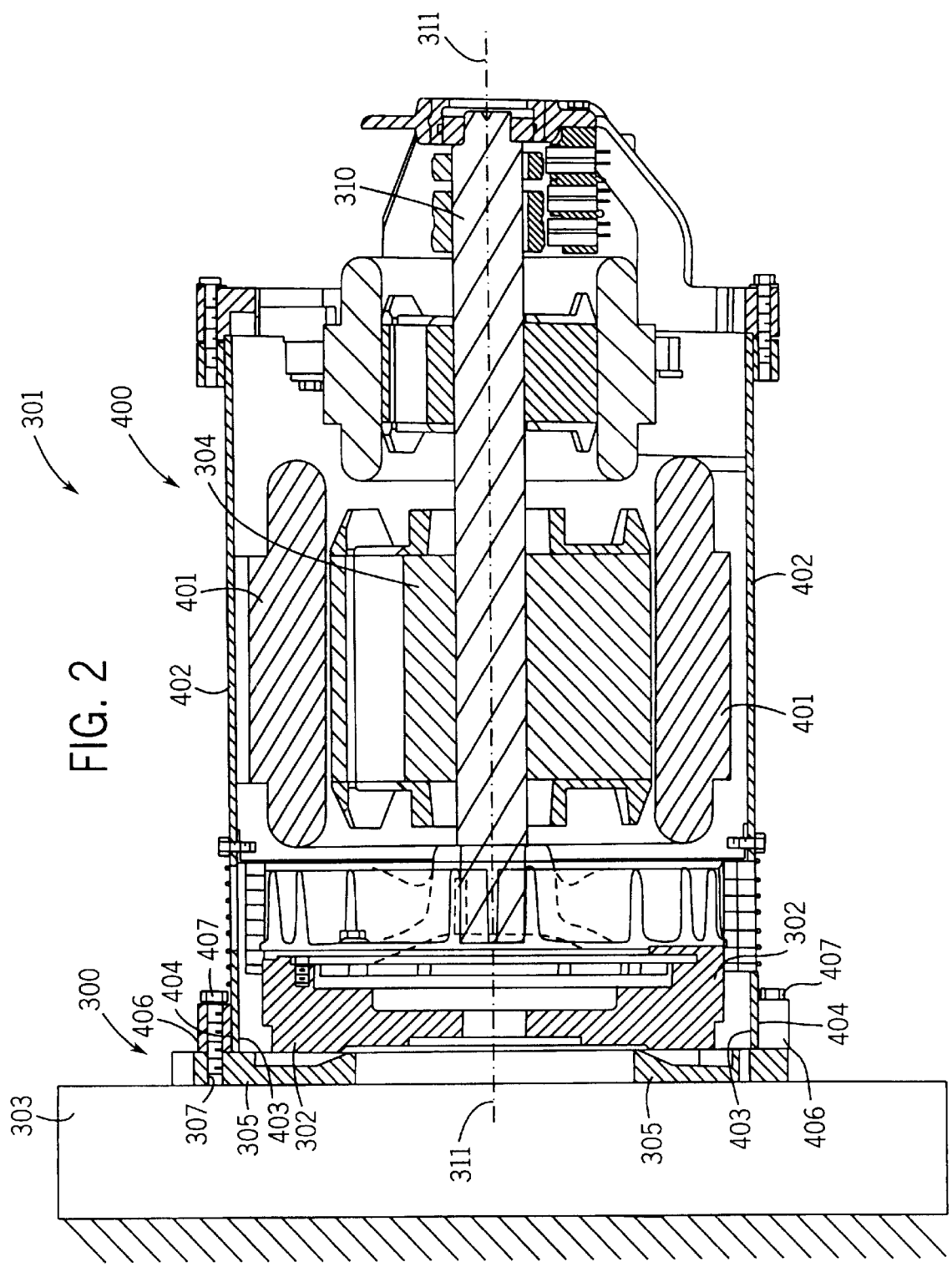
FIG. 2 shows a cross-section of a generator in accordance with the present invention.

FIG. 2 shows a generator 301 according to the preferred embodiment of the present invention that provides proper alignment. An engine/rotor 300 includes an engine 303, an output shaft 310, a flywheel 302, a starter motor (not shown), and a rotor 304. Flywheel 302 is mounted to output shaft 310. Rotor 304 is mounted to flywheel 302 and output shaft 310 at a predetermined and known location. Flywheel 302 and rotor 304 are operatively connected to output shaft 310 such that flywheel 302 and rotor 304 rotate with output shaft 310 about an axis 311. An adapter plate 305 is mounted behind flywheel 302, also at a predetermined and known location, and includes a plurality of pins 306 (see FIG. 3) and mounting holes 307. Pins 306 are disposed on the surface of adapter plate 305 to provide for concentric alignment of a stator with rotor 304 as will be explained later. As used throughout this entire specification, the phrases "to provide for concentric alignment" and "to allow for concentric alignment" mean to do so both directly and indirectly.

Although the adapter plate of the preferred embodiment is shown as a separate plate mounted to engine 303 the term adapter plate or the term wall as used herein means any plate or surface that is either part of, or attached to, an engine (or similar apparatus) and that can accommodate a structure or structures that provide for concentric alignment of a stator with a rotor, or one part of an assembly with another part of the assembly.

Pins 306 are round dowel pins which are press fit into pre-drilled holes in adapter plate 305 in the preferred embodiment of the present invention. The present invention, however, is not limited to the use of round dowel pins. The term pin, as used herein, means any structure of any shape that can be disposed at a discrete and separate location on an adapter plate such that a plurality of the pins properly located provide for concentric alignment of a stator with a rotor. The term includes studs, bolts, pins, or any similar structures, regardless of whether they are attached to the adapter plate or machined on to the surface of the adapter plate, and includes structures of any shape (round, square, irregular, etc. . . . ).

A stator housing assembly 400 according to the preferred embodiment of the present invention is also shown in FIG. 2. Stator housing assembly 400 includes a stator 401 and a housing 402. Housing 402, like prior art housing 202, is made by rolling a steel plate into a cylinder and then welding or otherwise joining the edges of the steel plate together. Stator 401 is then secured into housing 402 at a predetermined and known location. In the preferred embodiment, stator 401 is secured in place simply by press fitting stator 401 into housing 402. The present invention however is not limited to press fit stators, but rather includes any method whereby the stator is securely held inside of the housing. One end of housing 402 is adapted for attachment to engine/rotor assembly 300. The other end of housing 402 is adapted for attachment to, and alignment with, a bearing assembly or other device in a similar manner to the way in which stator housing assembly 400 is attached to and aligned with engine/rotor assembly 300.

Unlike prior art housing 202, however, no end rings are welded on to the ends of housing 402. Therefore, it is not the inside surface or the outside surface of an end ring that is used for aligning the stator housing assembly with pins 306. Instead, the inside housing surface 403 and/or the outside housing surface 404 of housing 402 are used to align the stator housing assembly 400 with engine/rotor assembly 300. (The details of how the alignment is accomplished are described below.) Mounting lugs 406 are welded to or formed on housing 402 and are used to secure stator housing assembly 400 to engine/rotor assembly 300.

The shape of housing 402 in the preferred embodiment of the present invention is cylindrical. This results in a circular cross section for inside housing a surface 403 and outside housing surface 404. The present invention, however, is not limited to housings with circular cross sections and any cross sectional shape is included. Alternative embodiments of the present invention utilize housings with square, rectangular, triangular, oval, or irregularly shaped cross sections.

Housing surface, as used herein, includes the surface located around the inside circumference or perimeter of the housing or interior to the perimeter of the housing, (interior housing surface) and the surface located around the outside circumference or perimeter of the housing (outer housing surface). The term housing surface does not include the closed inner surfaces of a pilot hole in which a single pin is disposed.

A starter motor gap 405 (FIG. 3) is cut directly out of the steel plate that makes up housing 402 in the preferred embodiment of the present invention. Although the preferred embodiment of the present invention is shown having only a single starter motor gap 405, other embodiments of the present invention can have more than one starter motor gap. A single stator housing assembly can accommodate engines from different manufacturers in this way. For instance, alternative embodiments of the present invention might have two, three, or four starter motor gaps cut out of the same housing 402. Generally, the present invention includes any stator housing assembly that can accommodate one or more engines, each engine having a starter motor positioned at a different location.

Figure 3:
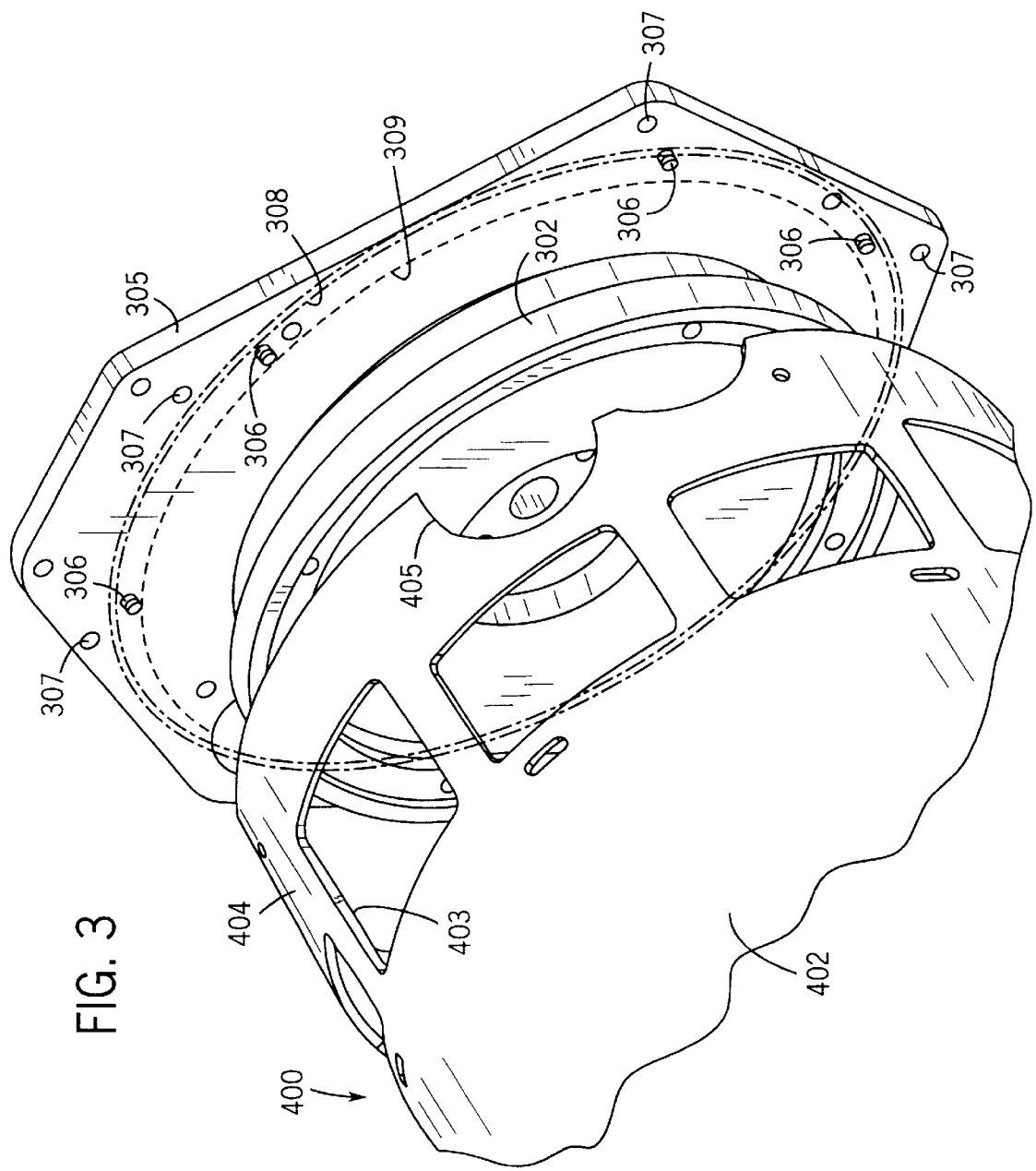
FIG. 3 shows a side perspective view of a stator housing assembly and an adapter plate in accordance with the present invention.
Figure 4:
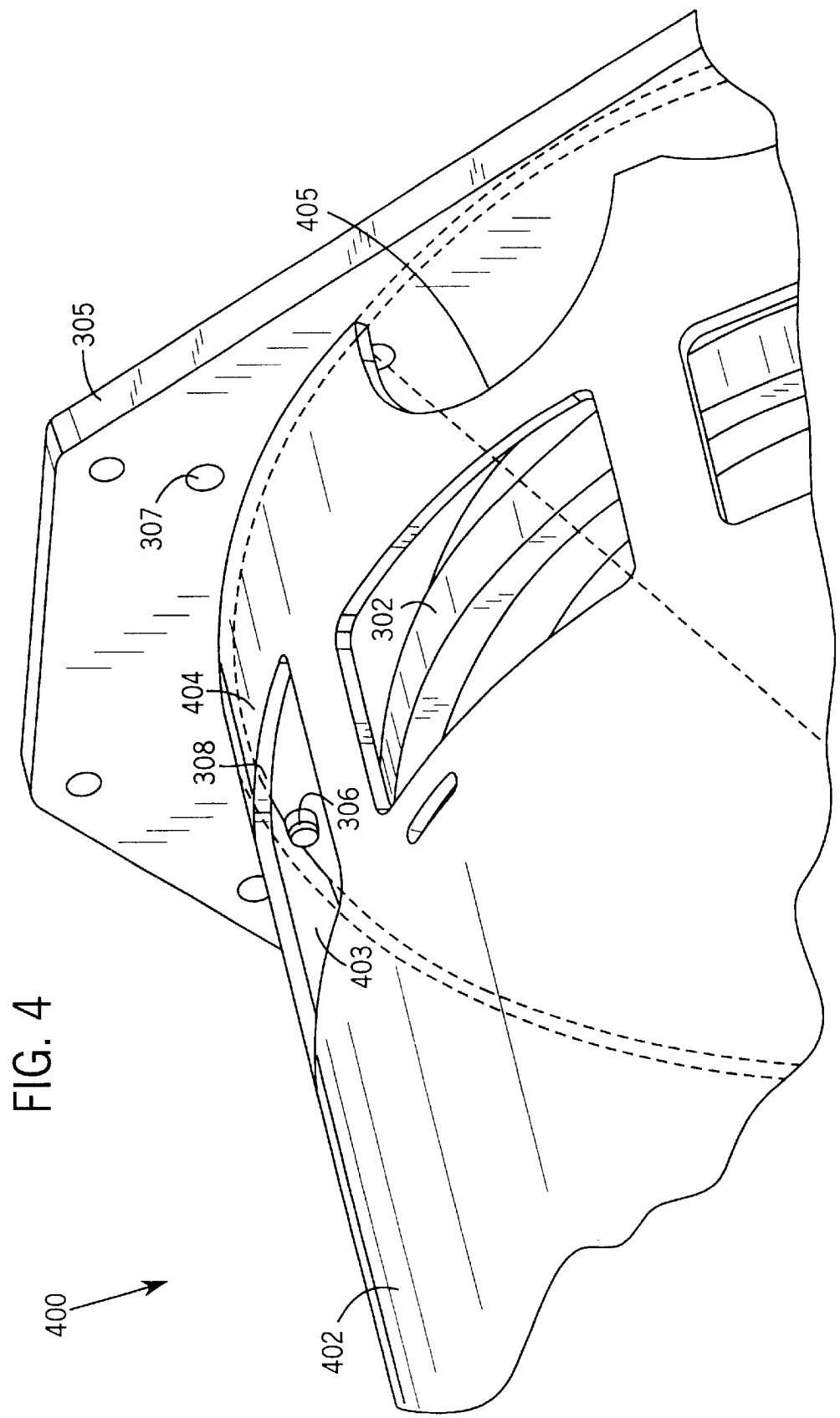
FIG. 4 shows a side perspective view of a stator housing assembly mounted to an adapter plate in accordance with the present invention.

Stator housing assembly 400 is mounted to engine/rotor assembly 300 in the following manner during assembly of the welding generator. First, adapter plate 305 is mounted to the Engine at a predetermined and known location behind flywheel 302. Next, stator housing assembly 400 (with stator 401 secured therein) is positioned in front of engine/rotor assembly 300 with the starter motor aligned with starter motor gap 405 (FIG. 3). One or more of the housing surfaces of housing 402 is then brought into contact with a plurality of the pins 306 on adapter plate 305.

In the preferred embodiment of the present invention, pins 306 are disposed at a known location on the surface of adapter plate 305 to provide for concentric alignment of stator 401 with rotor 304 when stator housing 400 is aligned with engine/rotor assembly 300. Pins 306 form a ring such that an imaginary circle 308 tangentially contacts the outside surface of each pin. The diameter of imaginary circle 308 is substantially the same as the diameter of inside housing surface 403 in the preferred embodiment. Inside housing surface 403 fits snugly over, and is in tangential contact with, each pin 306. The snug fit and tangential contact between the inner housing surface 403 and each pin 306 provides for concentric alignment of stator 401 with rotor 304. Stator housing assembly 400 is then secured to engine/rotor assembly 300 via mounting lugs 406 and mounting holes 307 using bolts 407 or other fasteners to complete attachment of stator housing assembly 400 to engine/rotor assembly 300.

In an alternative embodiment of the present invention, pins 306 form a ring such that an imaginary circle 309 (FIG. 3) tangentially contacts the inside surface of each pin. The diameter of imaginary circle 309 is substantially the same as the diameter of outside housing surface 404. Outer housing surface 404, therefore, fits snugly inside of, and in tangential contact with, each pin 306 in this alternative embodiment. The snug tangential fit between the outer housing surface 404 and each pin 306 provides for concentric alignment of stator 401 with rotor 304 as in the previous embodiment.

In yet another embodiment of the present invention, pins 306 are disposed on the surface of adapter plate 305 such that an imaginary circle 308 tangentially contacts the outside surface of some of the pins and an imaginary circle 309 tangentially contacts the inside surface of the remaining pins (see FIG. 3). The diameter of imaginary circle 308 is substantially the same as the diameter of the inside housing surface 403 and the diameter of imaginary circle 309 is substantially the same as the diameter of the outside housing surface 404 in this embodiment. In this way, outside housing surface 404 fits snugly inside of some of the pins 306 and in tangential contact with those pins and inside housing surface 403 fits snugly outside of the remaining pins and in tangential contact with those remaining pins. The snug tangential fit between the six pins and the two housing surfaces in this embodiment provides for concentric alignment of stator 401 with rotor 304.

Six pins are disposed oh the adapter plate to provide for concentric alignment of the stator with the rotor in the preferred embodiment of the present invention. The present invention is not limited to the use of six pins however. Fewer than six pins are used to provide for concentric alignment of the stator with the rotor in another embodiment of the present invention. More than six pins are used in a third embodiment of the present invention. The number of pins required to carry out the present invention is that number of pins that are needed to adequately provide for concentric alignment of the stator with the rotor for any given generator (or other device requiring concentric alignment).

In all of the previously discussed embodiments, the contact between the pins 306 and the housing surface (or surfaces) 403, 404 is tangential in nature. The present invention is not limited to tangential contact between the pins and the housing surface (or surfaces) however, and the present invention includes any contact that may exist between a pin and either the inner housing surface or the outer housing surface. For example, in an alternative embodiment of the present invention, square pins are used and a housing with a square cross section is used, or a curved pin with a radius matching the radius of the imaginary circle. The housing in these embodiments fit snugly on the outside of the pins and the inner housing surface is in contact with the entire outside edge of each of the pins, or more than tangential contact. Irregularly shaped pins are used in another embodiment and each of the irregularly shaped pins actually contacts the inner housing surface at several different points. Another alternative provides for the pins to contact an interior housing surface, away from the perimeter.

Numerous modifications may be made to the present invention which still fall within the intended scope hereof. Thus, it should be apparent that there has been provided in accordance with the present invention an apparatus and method for concentrically aligning a stator with a rotor in a welding generator. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An engine powered generator comprising:
   an engine;
   a plate mounted to the engine;
   a generator, mounted to the plate, including a rotor, a stator and a housing, wherein the stator is secured in the housing; and
   a plurality of pine disposed on the plate such that the stator is concentrically aligned with the rotor by contact of each of the plurality of pins with a surface of the housing, whereby the surface contacted is not a closed inner surface of a pilot hole in which a single pin is disposed.

2. The apparatus of claim 1 wherein the plurality of pins includes at least three pins.

3. The apparatus of claim 1 wherein the plurality of pins includes at least six pins.

4. The apparatus of claim 1 wherein the housing has an inner housing surface and at least one of the plurality of pins contacts the inner housing surface.

5. The apparatus of claim 4 wherein the housing has an outer housing surface and at least one of the plurality of pins contacts the outer housing surface.

6. The apparatus of claim 1 wherein the housing has an outer housing surface and at least one of the plurality of pins contacts the outer housing surface.

7. The apparatus of claim 1 wherein each of the plurality of pins is a dowel pin includes at least three pins.

8. The apparatus of claim 1 wherein each of the plurality of pins is cylindrical.

9. The apparatus of claim 1 wherein the housing has a circular cross section.

10. The apparatus of claim 1 wherein the contact with each of the plurality of pins is tangential.

11. A method for concentrically aligning a stator with a rotor of a generator powered by an engine, the method comprising:
   mounting a first plate to the engine wherein the first plate has a plurality of pins disposed thereon;
   securing the stator in a housing;
   aligning the stator with the rotor by contacting each of the plurality of pins with a surface of the housing, whereby the surface contacted is not a closed inner surface of a pilot hole in which a single pin is disposed; and
   mounting the generator to the first plate.

12. The apparatus of claim 11 wherein at least one of the plurality of pins contacts an interior housing surface.

13. The apparatus of claim 12 wherein at least one of the plurality of pins contacts an outer housing surface.

14. The apparatus of claim 11 wherein at least one of the plurality of pins contacts an outer housing surface.

15. The apparatus of claim 11 wherein each of the plurality of pins is cylindrical.

16. The method of claim 11 wherein the housing has a circular cross section and further comprising: aligning the housing with a plurality of pins disposed on a second plate such that each of the plurality of pins disposed on the second plate contacts a surface of the housing to concentrically align the stator with the rotor.

17. The apparatus of claim 11 wherein the contact with each of the plurality of pins is tangential.

18. An engine powered generator comprising:

an engine having a wall and an output shaft rotating about an axis, wherein the wall has a plurality of pins located about the axis and protruding from the wall;

a generator having a rotor, operatively connected to the output shaft and rotating about the axis, and a stator, secured in a housing;

said housing having a housing surface;

wherein said generator is located on said wall by contacting said pins with said housing surface at a first and of said housing, whereby the surface contacted is not a closed inner surface of a pilot hole in which a single pin is disposed.

19. The engine powered generator of claim 18 wherein the wall is substantially normal to the axis.

20. The engine powered generator of claim 18 wherein each of the plurality of pins protrudes from the wall parallel to the axis.

21. The engine powered generator of claim 18 wherein the plurality of pins includes at least three pins.

22. The engine powered generator of claim 18 wherein the housing has an inner housing surface and at least one or the plurality of pine contacts the inner housing surface.

23. The engine powered generator of claim 18 wherein the stator is permanently affixed to the housing.

* * * * *